United States Patent [19]
Griffiths

[11] 4,259,849
[45] Apr. 7, 1981

[54] CHEMICAL DEHUMIDIFICATION SYSTEM WHICH UTILIZES A REFRIGERATION UNIT FOR SUPPLYING ENERGY TO THE SYSTEM

[75] Inventor: William C. Griffiths, Lebanon, N.J.

[73] Assignee: Midland-Ross Corporation, Cleveland, Ohio

[21] Appl. No.: 12,384

[22] Filed: Feb. 15, 1979

[51] Int. Cl.³ .............................................. F25D 23/00
[52] U.S. Cl. ...................................... 62/271; 62/94; 55/84
[58] Field of Search ...................... 62/94, 271, 238 E; 55/83, 84

[56] References Cited

U.S. PATENT DOCUMENTS

| | | | |
|---|---|---|---|
| 2,672,024 | 3/1954 | McGrath | 62/94 |
| 3,102,399 | 1/1970 | Meckler | 62/94 |
| 3,200,606 | 8/1965 | Hewett et al. | 62/94 |
| 3,488,971 | 1/1970 | Meckler | 62/271 |
| 4,180,985 | 1/1980 | Northrup, Jr. | 62/94 |

*Primary Examiner*—Ronald C. Capossela
*Attorney, Agent, or Firm*—Harlan E. Hummer

[57] ABSTRACT

A sorbent-type air conditioning system which employs conventional refrigeration unit, including a compressor, evaporator, condenser and refrigerant. The cooling and heating effect or energy generated by the evaporator and condenser is the primary source of energy to temperature and moisture condition air and to regenerate or concentrate sorbent which becomes diluted during the moisture conditioning of the air.

7 Claims, 3 Drawing Figures

CHEMICAL DEHUMIDIFICATION SYSTEM WHICH UTILIZES A REFRIGERATION UNIT FOR SUPPLYING ENERGY TO THE SYSTEM

BACKGROUND OF THE INVENTION

The invention, although useful in any sorbent using dehumidifier, is particularly well suited for use in an air conditioning system that employs a liquid sorbent. Such a system is manufactured by the Ross Air Systems Division of the Midland-Ross Corporation under the trademark KATHABAR. This particular system uses lithium chloride or other halide brine as a liquid sorbent for dehumidifying air circulated through a conditioner. An external coolant, such as chilled water or refrigerant liquid, is used to cool the air. The diluted liquid sorbent from the conditioner, is passed through a regenerator where the moisture absorbed in the conditioner is removed to return the liquid sorbent to its normal concentration. This particular system works exceedingly well, but employs separate cooling and heating plants for supplying the cooling and heating energy utilized in the temperature and moisture conditioning of the air and in the regeneration of the liquid sorbent. The invention is directed to improving the use of energy in such a system.

The invention is also designed for use with a chemical dehumidifier that employs a solid sorbent and is best described in U.S. Pat. No. 3,488,971, which is typical of the many patents relating to air conditioning systems that utilize a conventional refrigeration apparatus because of the high energy output in the evaporator and condenser of the apparatus in relation to the low electrical energy input required to operate the compressor of the apparatus. These systems do not completely utilize the energy of the refrigeration apparatus, however, but waste considerable heating energy from the condenser by dissipating it to the outside environment, rather than capturing it for reuse in the system.

Briefly stated, the invention is in a system of the sorbent dehumidifying type for temperature and moisture conditioning of air. A conventional refrigeration unit is associated with the system and includes a compressor, evaporator, condenser, and a refrigerant which is circulated between the components of the unit. Sorbent using means are provided for cooling and dehumidifying the air and include means which coact between the evaporator and sorbent using means for utilizing cooling energy from the evaporator in the cooling and dehumidification of the air. Other means are supplied for concentrating sorbent that has become diluted during the dehumidification of the air, including means which coact between the condenser and the sorbent concentrating means for utilizing heating energy from the condenser in the concentration of the sorbent.

DESCRIPTION OF THE DRAWINGS

The following description of the invention will be better understood by having reference to the accompanying drawings, wherein.

DESCRIPTION OF THE INVENTION

Figure 1:
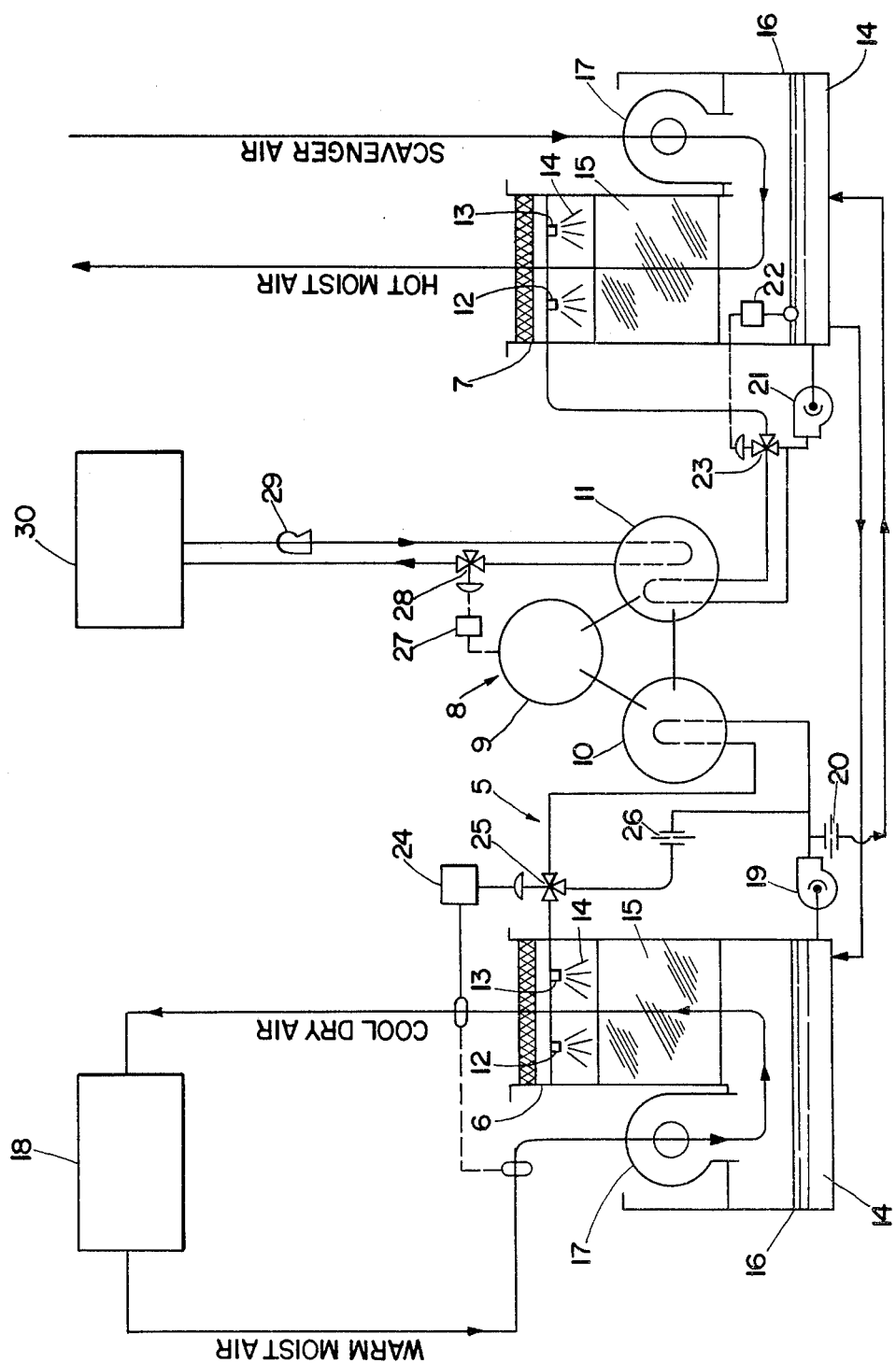
FIG. 1 is a schematic of an air conditioning system which uses a liquid sorbent and is made in accordance with the invention.

With reference to FIG. 1, there is shown an air conditioning and dehumidifying apparatus 5 which essentially comprises a first contactor tower 6, known as a conditioner, a second contactor tower 7 known as a regenerator, and a refrigeration unit 8 which is composed of conventional components of a compressor 9, an evaporator 10, a condenser 11, and any suitable refrigerant for circulation through the components of the refrigeration unit 8.

The conditioner 6 and regenerator 7 are essentially of the same construction, each comprising a plurality of sprays 12,13 for distributing any suitable liquid sorbent 14, e.g., lithium chloride, to a packing material 15 which is composed of, for example, corrugated sheet material impregnated with a thermosetting resin and through which the liquid sorbent trickles, by gravity, downwardly into a sump 16, and a blower 17 for circulating air, under pressure, upwardly through the towers 6,7 into intimate contact with the liquid sorbent 14 trickling downwardly through the packing material 15.

In operation, warm moist air from, for example, a space 18 to be air conditioned, is circulated through the conditioner 6 for cooling and dehumidification. Simultaneously, liquid sorbent 14 from the sump 16 of the conditioner 6, is circulated by a pump 19, under pressure, through the evaporator 10 and to the sprays 12,13 for distribution to the packing material 15 of the conditioner 6. The liquid sorbent 14 is cooled by the refrigerant as it evaporates within the evaporator 10. The liquid sorbent 14 becomes diluted during the dehumidification of the air, and needs concentration to its normal solution. An ordinary orifice plate 20, or other suitable device for metering the flow of a liquid, is provided to divert a portion of the liquid sorbent 14 from the sump 16 of the conditioner 6 to the sump 16 of the regenerator 7 from where the liquid sorbent 14 is circulated by a pump 21, under pressure, through the condenser 11 and to the sprays 12,13 for distribution to the packing material 15 of the regenerator 7. The liquid sorbent 14 is heated by the refrigerant in the condenser 11.

Simultaneously air generally from an outside source is circulated by the blower 17, under pressure, upwardly through the regenerator 7 for intimate contact with the heated liquid sorbent 14 trickling downwardly through the packing material 15. Moisture is desorbed from the heated, diluted liquid sorbent 14 as it contacts the air. The regenerated liquid sorbent 14 falls into the sump 16 of the regenerator 7 and, in this instance, flows, by gravity, back to the sump 16 of the conditioner 6.

In one mode of controlling the system, a sensor 22 monitors the level of the liquid sorbent 14 in the sump 16 of the regenerator 7 and acts to operate a valve 23 which controls circulation of the liquid sorbent 14 through the condenser 11, when the liquid sorbent 14 reaches a predetermined level in the sump 16 of the regenerator 7. A thermostat 24 senses the temperature of the air circulated either to or from the space 18 to be air conditioned and acts to operate a valve 25 which controls circulation of the liquid sorbent 14 through the evaporator 10 or through a by-pass line which contains a metering valve 26 and through which the liquid sorbent 14 by-passes the evaporator 10 and moves directly from the sump 16 to the sprays 12,13. A sensor 27 monitors the head pressure of the compressor 9 and acts to control a valve 28 and operates a pump 29 to regulate the flow of cool liquid, such as cold water from the cooling tower 30, through the condenser 11, if more heat is available from the condenser 11 than is needed to concentrate the liquid sorbent 14 from the sump 16 of the regenerator 7, since it becomes necessary to dissipate the heating energy being generated in the condenser 11. It can be appreciated from the foregoing description that the refrigeration unit 8 is the primary source of energy for cooling and heating the liquid sorbent 14, which results in the temperature and moisture conditioning of air to be conditioned and in the regeneration of diluted liquid sorbent for further use in the air conditioning process.

The apparatus 5 for air conditioning the space 18 in the summertime, is readily adapted to heating the space 18 in the wintertime, simply by providing a valving arrangement which (I) circulates the liquid sorbent 14 from the sump 16 of the conditioner 6 through the condenser 11, rather than the evaporator 10, and (II) circulates the liquid sorbent 14 from the sump 16 of the regenerator 7 through the evaporator 10, rather than the condenser 11, so that, in effect, the old conditioner becomes the new regenerator and the old regenerator becomes the new conditioner.

Figure 2:
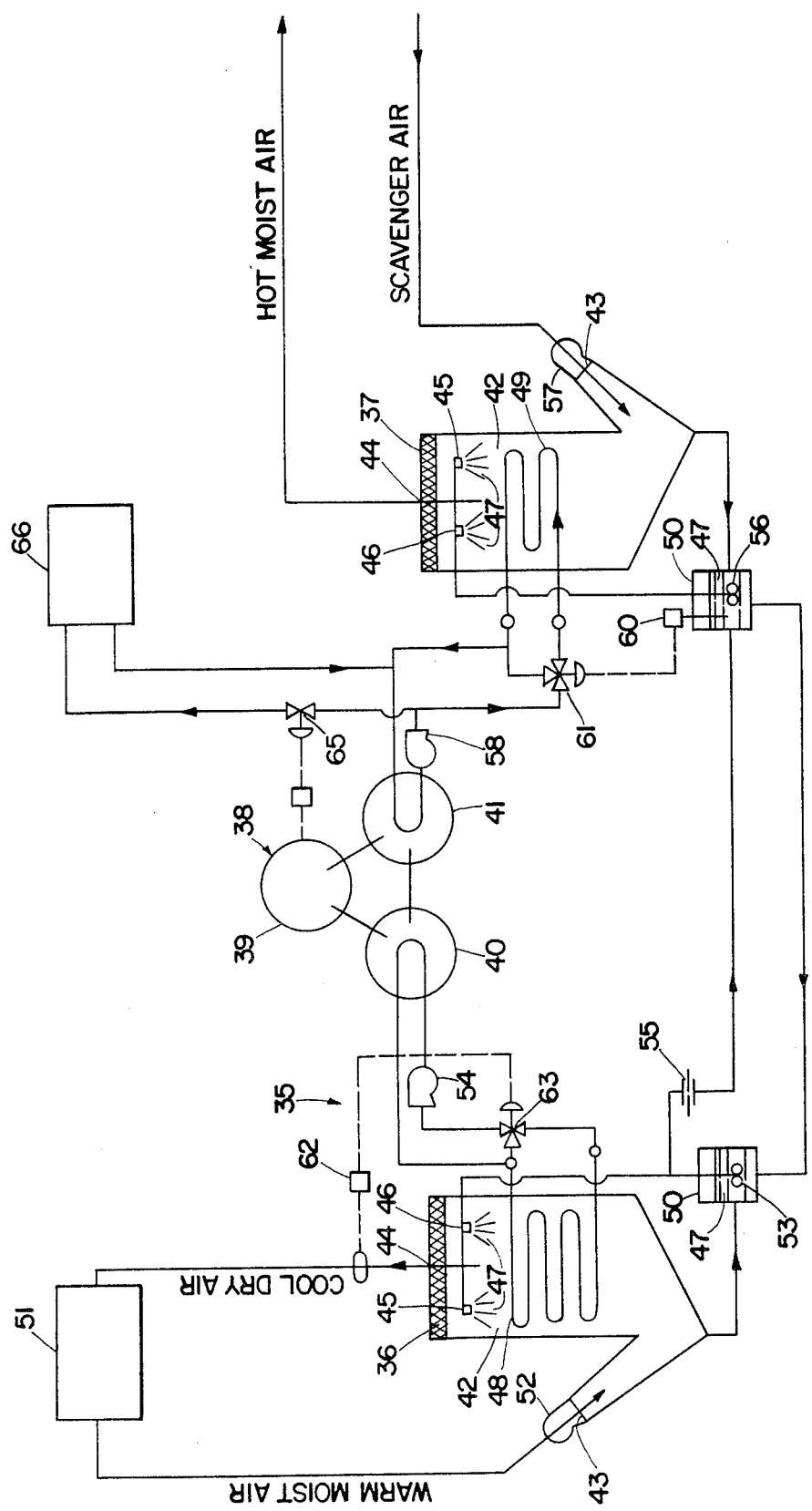
FIG. 2 is a schematic of another air conditioning system which uses a liquid sorbent and is made in accordance with the invention.

With reference to FIG. 2, there is shown an air conditioning and dehumidifying apparatus 34 which essentially comprises a first contactor tower 36 known as a conditioner, a second contactor tower 37 known as a regenerator, and a refrigeration unit 38 which is composed of conventional components of a compressor 39, an evaporator 40, a condenser 41, and any suitable refrigerant for circulation through the components of the refrigeration unit 38.

The conditioner 36 and regenerator 37 are essentially of the same conventional construction, each comprising a vertically elongated chamber 42 with an air inlet 43 and outlet 44 through which air, to be conditioned, enters and exits the chamber 42, and a plurality of sprays 45,46 located adjacent the air outlets 44 for distributing any suitable liquid sorbent 47, e.g. lithium chloride, within the chamber 45. A cooling coil 48 is disposed vertically below the sprays 45,46 in the chamber 42 of the conditioner 36, and a heating coil 49 is positioned vertically below the sprays 45,46 in the chamber 42 of the regenerator 37. A sump 50 is associated with each of the towers 36,37 for receiving diluted liquid sorbent 47 from the conditioner 36 and for receiving regenerated liquid sorbent 47 from the regenerator 37.

In operation, warm moist air from, for example, a space 51 to be air conditioned, is circulated by a blower 52 through the conditioner 36 for cooling and dehumidification. Simultaneously, liquid sorbent 47 is circulated by a pump 53 from the sump 50 of the conditioner 36 to the sprays 45,46 for distribution within the chamber 42 and contact with the air being circulated through the conditioner 36 to dehumidify the air. At the same time, a suitable liquid is circulated by a pump 54 through the evaporator 40 for cooling and then through the cooling coil 48 into heat exchanging relation with the air being circulated through the conditioner 36 to cool the air to the desired temperature. The liquid sorbent 47 is also cooled upon contact with the cooling coil 48, and to some extent, subsequently helps cool the air, uponn contact. The liquid sorbent 47 becomes diluted during the dehumidification of the air and needs concentration to its normal solution. An ordinary orifice plate 55, or other suitable device for metering the flow of a liquid, is provided to divert a portion of the diluted liquid sorbent 47 from the sump 50 of the conditioner 36 to the sump 50 of the regenerator 37 from where the liquid sorbent 47 is circulated by a pump 56, under pressure, to the sprays 45,46 for distribution within the chamber 42 of the regenerator 37. Simultaneously, air generally from an outside source, is circulated by a blower 57, under pressure, upwardly through the regenerator 37 into heat exchanging relation with liquid that is circulated by a pump 58, under pressure, through the condenser 41 for heating and then through the heating coil 49, and with the diluted liquid sorbent 47 which is also heated upon contact with the heating oil 49. Moisture is desorbed from the heated, dilute liquid sorbent 47 as it contacts the air. The regenerated liquid sorbent 47 flows into the sump 50 of the regenerator 37 and, in this instance, flows, by gravity, back to the sump 50 of the conditioner 36.

In one mode of controlling the system of FIG. 2, a sensor 60 monitors the level of the liquid sorbent 47 in the sump 50 of the regenerator 37 and acts to operate the pump 56 and a valve 61 which controls circulation of the heating liquid through the condenser 41 and heating coil 49 when the liquid sorbent 47 reaches a predetermined level in the sump 50 of the regenerator 37. A thermostat 62 senses the temperature of the air circulated either to or from the space 41 to be air conditioned and acts to operate a valve 63 which controls circulation of the cooling liquid through the evaporator 40 and cooling coil 48. A sensor 64 monitors the head pressure of the compressor 39 and acts to control a valve 65 to divert heated liquid from the heating coil 49 and regulate the flow of cool liquid, such as cold water from a cooling tower 66 through the condenser 41, if more heat is available from the condenser 41 than needed to concentrate the liquid sorbent 47 from the sump 50 of the regenerator 37, since it becomes necessary to dissipate the heating energy being generated in the condenser 41. The apparatus 35 can be converted for heating, the space 51 during the wintertime in a manner similar to that previously described in relation to apparatus 5.

Thus, it can be appreciated that, in both the apparatuses 5,35 of FIGS. 1 and 2, the refrigeration units 8,38 are used to supply the cooling and heating energy necessary to accomplish the cooling and dehumidification of air to be conditioned, and to regenerate liquid sorbent which becomes diluted during the dehumidification process.

Figure 3:
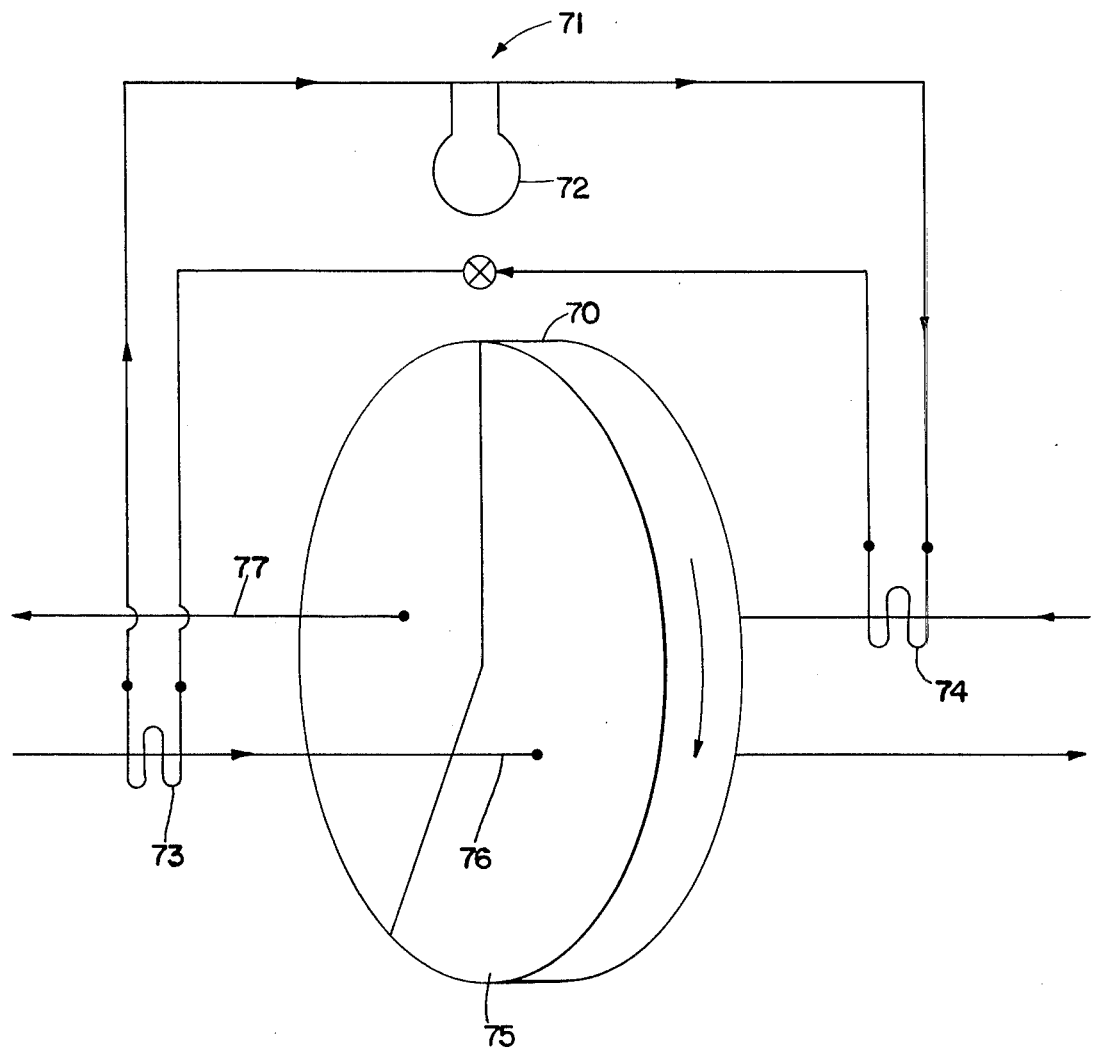
FIG. 3 is a schematic of still another air conditioning system which employs a solid sorbent and is made in accordance with the invention.

With reference to FIG. 3, there is shown a chemical dehumidifier 70 similar to that described, for example, in U.S. Pat. No. 3,488,971. The dehumidifier 70 is used in conjunction with a refrigeration system 71 which also includes conventional components of a compressor 72, an evaporator coil 73, a condenser coil 74, and a refrigerant which is circulated between the various components of the refrigeration unit 71. The dehumidifier 70 is typically cylindrical in shape and contains any suitable solid sorbent 75, such as activated alumina, silica gel, or a lithium chloride impregnated carrier. The dehumidifier 70 rotates about its longitudinal axis in a predetermined direction, e.g. clockwise as noted by the arrow. The flow of air through the dehumidifier is divided into two separated airstreams, the first of which is known as the dehumidifier airstream 76 because air of this airstream is dehumidified as it passes through the solid sorbent of the dehumidifier 70 in one direction, and the second of which is known as the regeneration airstream 77 because air of this airstream regenerates the solid sorbent 75 as it passes through the dehumidifier 70 in an opposite direction. In operation, air to be cooled and dehumidified is first cooled by passage through the evaporator coil 73 and then dehumidified by passage through the solid sorbent 75 as a dehumidified airstream 76. Other air is simultaneously heated by passage through the condenser coil 74 and subsequently passed, as a regeneration airstream 77, through a section of the solid sorbent 75, previously passed through by a dehumidified airstream 76, to regenerate the portion of the solid sorbent 75 for subsequent use in the dehumidification process. The refrigeration unit 71, in this instance, acts like the other refrigeration units 8,38 to provide the cooling and heating energy necessary in the cooling and dehumidification of the air and in the regeneration of the sorbent which is solid and not liquid.

In a typical industrial installation, liquid sorbent 14 is distributed to the packing material 15 of the conditioner 6 at a temperature of about 40° F. for cooling and dehumidifying the warm moist air being circulated through the conditioner 6. The temperature of the liquid sorbent 14 in the sump 16 of the conditioner is about 50° F., whereas the temperature of the liquid sorbent 14 in the sump 16 of the regenerator 7 is about 125° F. The temperature of the liquid sorbent 14, being distributed to the packing material 15 of the regenerator 7 is about 150° F.

To maintain an air conditioned industrial space at 72° F., 46 Gr/# 40% relative humidity using a Kathabar air conditioning system, it has been figured that a steam plant for supplying heating energy in the regeneration of the liquid sorbent, would be required to produce about 344 pounds of steam per hour at 30 psig. Further, that the refrigeration plant for providing cooling energy in the air conditioning and dehumidification of the air, would be required to produce about 46 tons of cooling effect at 42° F., and use about 41 kilowatts per hour in its operation. A cooling tower used in conjunction with the refrigeration plant, would be required to provide 58 tons of cooling effect at 85° F.

By comparison, the air conditioning apparatus 5 of the invention would require a refrigeration unit 8 which uses about 47 kilowatts per hour in providing comparable refrigeration of 46 tons of air at 49° F. However, the cooling tower required would only have to provide 30 tons of liquid at 90° F., or about half as much as heretofore needed. Moreover, the steam plant and the energy required to operate it, would be eliminated. From this it can be appreciated that there is a substantial energy savings using the inventive concept in a conventional Kathabar system.

Thus, there has been described a unique combination of a conventional refrigeration unit and dehumidifier, wherein the cooling and heating energy of the evaporator and condenser of the refrigeration unit are utilized as the primary sources of energy in the temperature and moisture conditioning of air and in the regeneration of a liquid or solid sorbent used in the moisture conditioning process. Heating energy from the condenser is used and not wasted by dissipating it to the outside atmosphere via a cooling tower, evaporative condenser, or air-cooled condenser, as is done in the prior art.

What is claimed is:

1. A system of the liquid sorbent dehumidification type for temperature and moisture conditioning of air, comprising:
   (a) a refrigeration unit including a compressor, evaporator, condenser and refrigerant circulated therein;
   (b) liquid sorbent using means for cooling and dehumidifying air, said means including means coacting with the evaporator for utilizing cooling energy from the evaporator in the cooling and dehumidification of air by the liquid sorbent using means;
   (c) means for regenerating liquid sorbent from the liquid sorbent using means, including means coacting with the condenser for utilizing heating energy from the condenser to remove undesireable moisture from the sorbent and improve the concentration of the sorbent from the sorbent using means;
   (d) the sorbent using means and the sorbent regeneration means including at least a pair of contactor towers, one of which is a conditioner wherein air is cooled and dehumidified, and the other of which is a regenerator wherein diluted liquid sorbent is concentrated, each of the towers comprising:
      (I) means for distributing liquid sorbent within the tower;
      (II) means for circulating air, under pressure, through the tower and into contact with liquid sorbent being distributed therein;
      (III) a sump associated with each tower for receiving liquid sorbent after it contacts the air;
      (IV) the conditioner including, a cooling coil interposed between the associated sump and distributing means, and means for circulating a liquid through and between the evaporator and cooling coil; and
      (V) the regenerator including, a heating coil interposed between the associated sump and distributing means, and means for circulating a liquid through and between the condenser and heating coil.

2. The system of claim 1, which includes means for directing excess heat from the condenser to an externally disposed heat sink.

3. The system of claim 1, which includes means for circulating liquid sorbent between the sumps associated with the conditioner and regenerator, and means for circulating liquid sorbent from the sumps to the distributing means of an associated tower.

4. A system of the liquid sorbent dehumidification type for temperature and moisture conditioning of air, comprising:
   (a) a refrigeration unit including a compressor, evaporator, condenser and refrigerant circulated therein;
   (b) liquid sorbent using means for simultaneously cooling and dehumidifying air, said means including a first contactor tower comprising:
      (I) a vertically elongated chamber having a pair of opposing vertically spaced ends;
      (II) packing material disposed in the chamber between the opposing ends and extending transversely across the chamber;
      (III) means spaced vertically above the packing material for spraying liquid sorbent downwardly onto the packing material, so that the liquid sorbent will trickle, by gravity, downwardly through the packing material;

(IV) a sump disposed vertically below the packing material for receiving liquid sorbent after it trickles through the packing material;

(V) means for circulating liquid sorbent from the sump through the evaporator into heat exchange relation with refrigerant therein and subsequent circulation to the spraying means;

(IV) means for circulating air, to be temperature conditioned, upwardly through the packing material into contact with liquid sorbent, cooled in the evaporator;

(c) means for regenerating liquid sorbent from the liquid sorbent using means, including a second contactor tower comprising:

(IV) a vertically elongated chamber having a pair of opposing vertically spaced ends;

(II) packing material disposed in the chamber between the opposing ends and extending transversely across the chamber;

(III) means disposed vertically above the packing material for spraying liquid downwardly onto the packing material, so that the liquid sorbent will trickle, by gravity, downwardly through the packing material;

(IV) a sump disposed vertically below the packing material for receiving liquid sorbent after it trickles through the packing material;

(V) means for circulating liquid sorbent from the sump of the second contactor tower, through the condenser into heat exchange relation with refrigerant therein and subsequent circulation to the spraying means of the second contactor tower;

(VI) means for circulating air upwardly through the packing material into contact with liquid sorbent trickling through the packing material; and (d) means for circulating liquid sorbent between the sumps of the first and second contactor towers.

5. The system of claim 4, which includes means for monitoring the level of liquid sorbent in the sump of the second contactor tower and causing circulation of said liquid from said sump through the condenser when said liquid reaches a certain level in said sump.

6. The system of claim 5, which includes means for sensing the temperature of the air circulated to or from the first contactor tower and for controlling circulation of liquid sorbent in the sump of the first contactor tower through the evaporator.

7. The system of claim 4, which includes means for rejecting excess heat from the condenser to an externally disposed heat sink.

* * * * *